March 9, 1965   M. CARLONI   3,172,765
PROCESS FOR THE TREATMENT OF SHAPED FOOD PASTE
Filed June 28, 1961
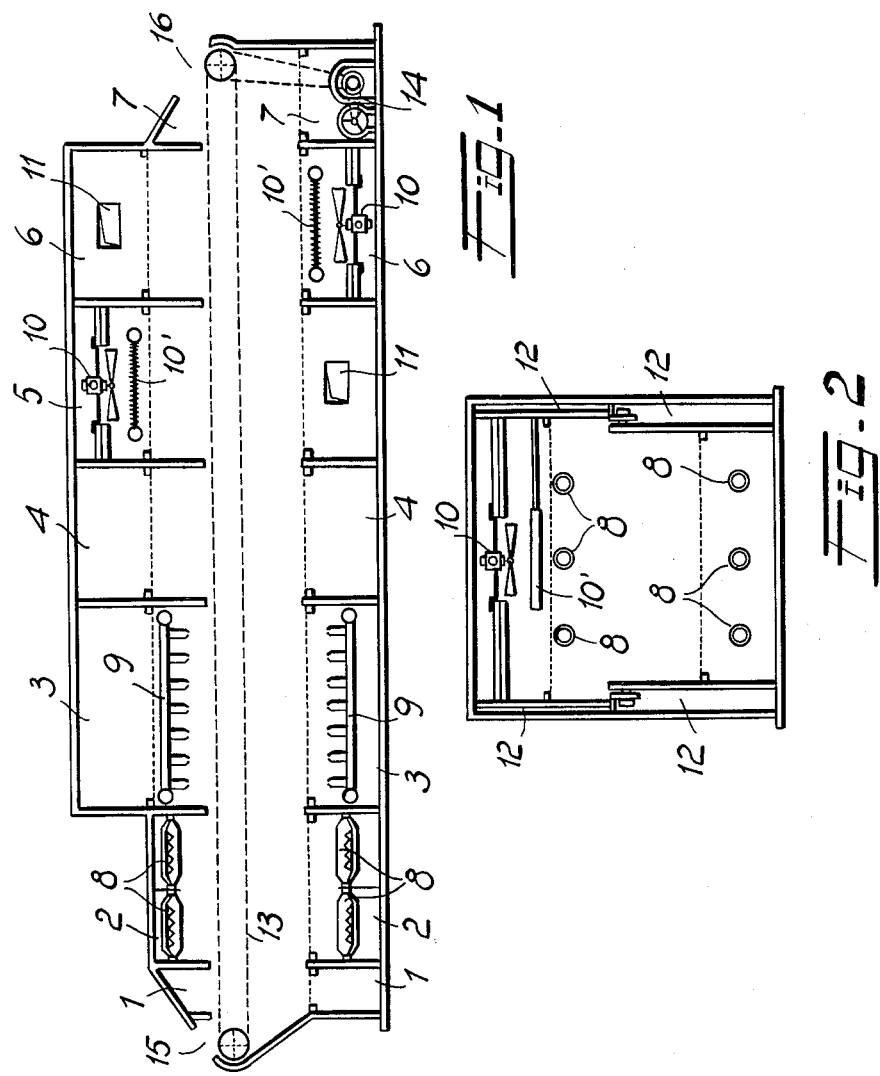
INVENTOR.
Mario Carloni
BY
Agent

3,172,765
PROCESS FOR THE TREATMENT OF SHAPED FOOD PASTE
Mario Carloni, Leghorn, Italy
(% Dr. G. Modiano, Via Meravigli 16, Milan, Italy)
Filed June 28, 1961, Ser. No. 122,378
Claims priority, application Italy, July 2, 1960, 649,456
1 Claim. (Cl. 99—85)

The present invention relates to a new process for the treatment of food paste of the class comprising macaroni, spaghetti, vermicelli, and similar, particularly in the stage of drying following that of curing or pre-drying.

It is known that in spite of progress made in recent years in the art of food paste making, with the process of working on the paste in a vacuum and using extruders of plastic material, and also with the improvement in the curing and drying equipment, commercial paste of the type described still has today the following defects to a greater or lesser extent:

(1) The use of abundant artificial colouring matter is widespread (in order to give the paste its characteristic amber yellow colour) and the effects thereof can be given positive value only on the commercial level. In current manufacturing processes, in fact, the liposoluble yellow pigments, belonging to the group of the carotenoids, present in the grain are destroyed, and hence artificial colouring agents are used.

(2) The paste easily sticks together, crumbles and tends to fall apart under cooking.

(3) Parasites make their appearance in the paste and are the cause of considerable harm, particularly in the case of packeted paste.

Furthermore the processes for manufacturing and treating the paste hitherto known require a considerable treatment time and are found to be complex and costly.

An object of the present invention is to overcome the defects listed herein which are present in existing pastes, by providing not only for the elimination of sticking, crumbling and disintegration under cooking, but also for the absence of parasites.

Another object of the invention is to make the product preservable for longer periods and enhance the natural grain yellowness in the pieces of paste, thus abandoning the use of artificial colouring matter.

A further object of the present invention is to provide a process whereby food paste can be treated in a more effective and economical manner.

This and other objects which will appear from the following description, are achieved by means of a process for the treatment of the paste of the type described after the conventional stage of pre-drying thereof, said process being characterized mainly in that, after the conventional stage of pre-drying by heating, the hot paste is treated with super-heated steam and then undergoes final drying.

If the paste has not reached a temperature of at least 50–70° C. in the pre-drying stage, or if pre-dried but cold paste is used as the initial material in the process according to the invention, then before the stage of treatment with supper-heated steam, there must be a stage whereat the paste is heated, for example by means of infrared rays, thus increasing its temperature to below 100° C., say, about 60° to 80° C. or even further, in order to avoid steam condensing on the surfaces of the paste when the latter is first sprayed by steam jets during the super-heated steam treatment stage, since such condensation would cause serious trouble as can readily be imagined by one skilled in the art.

In the drying stage after the super-heated steam treatment stage, the paste loses its water more rapidly than is the case in known processes.

Thanks to the treatment of the paste according to the present invention, the starch is transformed into starch paste, and the gluten into a tenacious, elastic mass, and thermal coagulation of the protids is brought about; a state of equilibrium amongst the main components of the same raw material is thus reached, and enzymatic action is eliminated, thus producing a high quality paste with properties which could not be provided by known processes.

In particular, thanks to the treatment with superheated steam and thanks to the reduction of the duration of heating in the drying stage, the yellow pigments present in the grain are not destroyed, so that the final appearance of the past obtained by the process according to the invention is such as not to require the use of artificial colouring matter.

Thanks to the treatment with super-heated steam according to the invention, the paste becomes clear and transparent, and its value to the organism as a food is enhanced. By this process the defects of present-day commercial food paste are eliminated, and its tendency to stick, crumble, and disintegrate under cooking disappears. Drying is also speeded up, parasites are prevented from appearing in the paste, and it becomes possible to preserve the paste for a longer time.

The equipment for carrying out the invention process may comprise a chamber for the preliminary heating of the paste, a vaporization chamber with means for admitting super-heated steam, a final drying chamber, and means for conveying the paste through the successive chambers of the equipment.

The inventive process and the process itself will now be more fully described with reference to the accompanying drawing wherein:

FIG. 1 shows a diagrammatic longitudinal section view of an examplificative equipment for carrying out the process according to the invention.

FIG. 2 shows a diagrammatic inlet end view of the equipment according to FIG. 1, with end wall and conveyor drum omitted.

With reference to the figures, the numeral 1 indicates an inlet chamber and the numeral 2 indicates the first heating chamber fitted with heat sources 8 which, in this example consist of infra-red ray lamps which are per se well known in the art. The numeral 3 indicates the chamber for vaporization with super-heated steam, containing a set of nozzles 9 for steam jets. The numeral 4 indicates another static or neutral chamber for a short transition period between the steam treatment stage and the drying stage and the numerals 5 and 6 indicate the final drying chambers which are ventilated with heated air blow by a ventilator 10 and heated by a heater 10' and 7 is the outlet chamber. In this non-limiting example, chambers 1, 2, 3, 4, 5, 6 and 7 follow each other in a horizontal line and a conveyor belt 13, which may be in the form of a chain or in the form of a net, is arranged so as to pass approximately through the middle of the chambers shown, thus conveying the paste on itself in known manner, whatever be the shape of the paste to be treated. It is well known that the belt is made in the form of a chain for long paste, or in the form of a mesh band for short paste. It can be vibrated in known manner in order to improve the treatment of the paste. Belt 13 is driven through the motor-variator-speed reducer unit 14. The ports for discharging the damp air are also shown in 11.

The equipment functions as follows: the paste is introduced into the equipment according to the invention through inlet end 15, by means which are per se known, and is arranged on conveyor 13 and conveyed thereby through the treatment chambers until it reaches the output end 16 where it is discharged from the equipment in a known manner.

The speed of advancement of the paste, that is of conveyor 13, depends on the type and shape of the paste to be treated, and the same consideration applies to the treatment conditions in the various chambers, that is the duration of the treatment and the temperature at which it takes place. As an example, some numerical values which have given satisfactory results for a paste about 10 cm. long and 2–3 cm. wide, will now to given. The temperature of the super-heated steam gave also good results when in the range from 101° to 170° C. and even up to 180° C. for a steam treatment duration from 30 to 5 seconds. The speed of advancement of conveyor 13 depended both on the length of the treatment chambers and on the desired treatment time. The average speed was 0.1 m. per second. The temperature to which the paste was heated in chamber 2 reached values between 50° and 80° C.

In the case where the paste is of a type or shape requiring longer treatments, the path of the transporter chain 13 can also have vertical sections. In this case in the vertical sections of the chain the super-heated steam nozzles must be disposed at the side of the transporter chain, in order to direct the spray laterally against the plane along which the paste is conveyed. Besides the normal type of super-heated steam ejecting nozzles with manifold as shown in the figure, box-like manifold steam collectors can also be used, fitted with a plurality of holes through which the steam is ejected in the direction of the chain conveying the paste.

It should be noted that the process according to the invention is suitable for the treatment of any type and shape of food paste such as macaroni, spaghetti, vermicelli and similar paste products, without substantial modifications having to be made to the equipment and to the operating cycle.

It is manifest that many modifications can be made in the invention without thereby departing from the inventive scope thereof as described in the following claim.

I claim:

A process for treating pre-dried food paste selected from the group consisting of spaghetti, macaroni and vermicelli, which comprises heating said pre-dried food paste until said pre-dried paste reaches a temperature between 60 and 100° C., treating the thus heated paste with superheated steam having a temperature of from 101° C. to 180° C. for a period of from 5 to 30 seconds and drying the steam treated food paste.

References Cited by the Examiner
UNITED STATES PATENTS

| | | | |
|---|---|---|---|
| 2,549,216 | 4/51 | McK Martin | 99—182 |
| 2,555,235 | 5/51 | Huzenlaub | 99—80 |
| 2,571,555 | 10/51 | Fernandes | 99—237 |
| 2,638,838 | 5/53 | Talmey | 99—237 |
| 2,677,613 | 5/54 | Shiah | 99—80 |

A. LOUIS MONACELL, *Primary Examiner.*

TOBIAS E. LEVOW, ABRAHAM H. WINKELSTEIN,
*Examiners.*